(12) United States Patent
Suda et al.

(10) Patent No.: US 7,320,434 B2
(45) Date of Patent: Jan. 22, 2008

(54) METHOD OF CONTROLLING ELECTRONIC CONTROLLED THERMOSTAT

(75) Inventors: Norio Suda, Tokyo (JP); Hiroshi Suda, Tokyo (JP); Mitsuhiro Sano, Tokyo (JP); Daisuke Tsukamoto, Tokyo (JP); Masahiro Aburakawa, Tokyo (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 590 days.

(21) Appl. No.: 10/496,016

(22) PCT Filed: Aug. 26, 2003

(86) PCT No.: PCT/JP03/10808

§ 371 (c)(1),
(2), (4) Date: Jun. 1, 2004

(87) PCT Pub. No.: WO2004/036007

PCT Pub. Date: Apr. 29, 2004

(65) Prior Publication Data

US 2005/0006487 A1    Jan. 13, 2005

(30) Foreign Application Priority Data

Oct. 18, 2002    (JP)    ............................ 2002-304033

(51) Int. Cl.
| | | |
|---|---|---|
| F01P 7/02 | (2006.01) | |
| F01P 7/00 | (2006.01) | |
| F01P 7/14 | (2006.01) | |
| G05D 23/02 | (2006.01) | |
| G05D 23/08 | (2006.01) | |
| G05D 23/12 | (2006.01) | |
| G05D 23/19 | (2006.01) | |
| F16K 35/06 | (2006.01) | |

(52) U.S. Cl. .................... 236/34; 236/34.5; 236/93 A; 236/93 R; 236/99 K; 123/41.02; 123/41.05; 123/41.1

(58) Field of Classification Search ............... 236/34.5, 236/34, 93 A, 93 R, 99 K; 123/41.05, 41.1, 123/41.02
See application file for complete search history.

(56) References Cited

U.S. PATENT DOCUMENTS 4,417,689 A * 11/1983 Sasaki ...................... 236/92 R
(Continued)

FOREIGN PATENT DOCUMENTS

JP    10-8960    1/1998
(Continued)

*Primary Examiner*—Cheryl Tyler
*Assistant Examiner*—Azim Rahim
(74) *Attorney, Agent, or Firm*—Oblon, Spivak, McClelland, Maier & Neustadt, P.C.

(57) ABSTRACT

An electronically controlled thermostat control method is obtained which makes it possible to eliminate the response delay from the time that the required cooling water temperature is set to the time that the actual cooling water temperature reaches the set water temperature by controlling the flow rate, and to realize high cooling water temperature tracking characteristics with a high degree of precision at a low cost.

The method of the present invention is characterized in that in an electronically controlled thermostat which is used to control the cooling water temperature of an engine, and which comprises an actuator that can arbitrarily vary the degree of valve opening without depending only on the actual cooling water temperature, the actuator is controlled by the control controller, which has means for calculating the elapsed time from the powering of the actuator to the variation of the water temperature for predicting the water temperature after the elapsed time when the cooling water temperature is controlled to an arbitrarily set water temperature, and the actuator is controlled in advance in accordance with the above-described predicted water temperature.

17 Claims, 13 Drawing Sheets

U.S. PATENT DOCUMENTS

| | | | |
|---|---|---|---|
| 4,681,254 A * | 7/1987 | Kammerer | 236/42 |
| 5,390,632 A * | 2/1995 | Ikebe et al. | 123/41.02 |
| 5,404,842 A | 4/1995 | Matsushiro et al. | |
| 6,152,376 A * | 11/2000 | Sandelman et al. | 236/68 R |
| 6,223,700 B1 * | 5/2001 | Sano et al. | 123/41.1 |
| 6,505,580 B2 * | 1/2003 | Chamot et al. | 123/41.1 |
| 6,817,321 B2 * | 11/2004 | Takei et al. | 123/41.09 |
| 6,857,576 B2 * | 2/2005 | Peter | 236/34.5 |

FOREIGN PATENT DOCUMENTS

| | | |
|---|---|---|
| JP | 10-317967 | 12/1998 |
| JP | 11-22465 | 1/1999 |
| JP | 11-287123 | 10/1999 |
| JP | 2000-45773 | 2/2000 |
| JP | 2001-32714 | 2/2001 |
| JP | 2001-242073 | 9/2001 |
| JP | 2002-155737 | 5/2002 |
| JP | 2000-303842 | 10/2002 |

* cited by examiner (a)

ORDINARY OPERATOR (b)

LOW-LOAD FREQUENT USE OPERATOR (c)

HIGH-LOAD FREQUENT USE OPERATOR

METHOD OF CONTROLLING ELECTRONIC CONTROLLED THERMOSTAT

TECHNICAL FIELD

The present invention relates to an electronically controlled thermostat control method for which allows the arbitrary variation of the degree of valve opening without depending on the actual temperature alone in an engine cooling water temperature control system which variably sets the cooling water temperature in accordance with the load of an engine used in an automobile or the like (hereafter referred to as an "engine"). Included is, for example, a system in which a temperature sensing part disposed in a heat-sensing part, and a system in which a valve is controlled by a motor.

BACKGROUND ART

In automobile engines, water cooling type cooling systems using a radiator are generally used in order to cool the engine. Conventionally, furthermore, in cooling systems of this type, a control valve, e.g., a thermostat, which controls the amount of cooling water that is circulated on the radiator side so that the temperature of the cooling water that is introduced into the engine can be controlled, has been used in order to improve the fuel consumption of the automobile. Thermostats that use a thermal expansion body as an actuator for controlling the valve, thermostats that depend on electronic control and the like are known as such thermostats.

Such thermostats are devices which can control the temperature of the cooling water to a specified state by interposing a valve part in a portion of the cooling water passage, closing this valve part and circulating the cooling water through a bypass passage without passing the cooling water through the radiator in cases where the cooling water temperature is low, and opening this valve part so that the cooling water is circulated through the radiator in cases where the cooling water temperature is high It is generally known that an improvement in automobile fuel consumption can be achieved by lowering the cooling water temperature in cases where the automobile engine is operated under a high load, and raising the cooling water temperature in the case of a low load.

Under such conditions, electronically controlled valves, i.e., electronically controlled thermostats, have been used in recent years in order to provide the optimal water temperature for improving the fuel consumption of automobiles. Such electronically controlled thermostats are devices which control the cooling water temperature by arbitrarily controlling the degree of opening of the valve part, and controlling the cooling fan that is attached to the radiator, and which can thus perform appropriate control of the cooling water temperature. The reason for this is that the control device (engine control module) that variably controls the abovementioned electronically controlled thermostat can perform a control action while also obtaining various parameters in the engine control unit, e.g., detected information such as the cooling water temperature, outside air temperature, vehicle speed, engine rpm, degree of opening of the throttle and the like.

Various devices have been proposed in the past as devices that can achieve an improvement in fuel consumption by performing such cooling water temperature control under specified conditions.

For example, electronically controlled thermostats which are devised so that a heat-radiating element is mounted in the temperature sensing part of the thermostat, and quick heating of the cooling water during engine starting and an improvement in the fuel consumption of the engine are achieved by using heat radiation control of this heat-radiating element in combination, have already been proposed in the past (for example, see Japanese Patent Application Laid-Open No. 2001-317355).

As was described above, problems that must be considered when controlling the cooling water temperature in an electronically controlled thermostat include the "response characteristics from the setting of the powering of the actuator to the variation in the water temperature".

Specifically, in conventional electronically controlled thermostat control methods, various factors such as undershooting, overshooting, hunting, rate of heat exchange of the cooling water and the like have on the time period extending from the powering of the actuator to the opening of the valve so that the actual water temperature shifts to the target water temperature; accordingly, a considerable time is required for this operation.

Conventionally, furthermore, the electrical circuit used to power the PTC used as a heat generating device mounted on the abovementioned actuator has been a constant-voltage circuit; accordingly, since the resistance value of the PTC varies with the temperature, a constant heat radiation quantity cannot be ensured. For example, assuming that the powering of the PTC is 10 W at 0° C., the powering is 5 W when the temperature of the PTC reaches 100° C.

Furthermore, in automobiles, the following problem also arises: namely, because of individual differences in the manner in which the driver rides, the layout of the cooling water circulation system in each vehicle, differences in thermostats and the like, it is difficult to determine the best set water temperature for the vehicle in the design stage; accordingly, it is desirable that attention also be given to such points.

The present invention was devised in light of such facts; it is an object of the present invention to obtain an electronically controlled thermostat control method which makes it possible to overcome the abovementioned problems encountered in the past, and to obtain an electronically controlled thermostat control method which makes it possible to realize high cooling water temperature tracking characteristics with a high degree of precision at a low cost.

Furthermore, it is another object of the present invention to obtain an electronically controlled thermostat control method which makes it possible to supply a set water temperature that is always suited to the vehicle, and to realize optimal fuel consumption and optimal powering, at a low cost, by providing engine load judgment means or a learning function.

DISCLOSURE OF THE INVENTION

In order to achieve such objects, the electronically controlled thermostat control method according to one embodiment of the present invention is characterized in that in an electronically controlled thermostat which is used to control the cooling water temperature of an engine, and which comprises an actuator that can arbitrarily vary the degree of valve opening without depending only on the actual cooling water temperature, a control controller, in addition to performing electrical powering for the purpose of actuating said actuator, calculates the elapsed time from the powering to the resulting actuation of the control actuator and variation of the temperature and the amount of water temperature variation per unit time for predicting the cooling water temperature following the elapsed time, and controls said actuator in accordance with said predicted water temperature.

Furthermore, the present invention is characterized in that a control method that can be applied in common to various types of actuators used in other electronically controlled thermostats is obtained.

Here, the term "control of the actuator in advance" refers to control in which the time required for the set temperature to reach the calculated control water temperature is calculated, the water temperature following the passage of this time lag is predicted, and the powering of the actuator is controlled in advance in accordance with this predicted water temperature so that the response delay from the time that the powering of the actuator is determined to the time that the actual water temperature is reached is eliminated.

Furthermore, the "actuator" is an electric motor or solenoid that opens and closes the valve, or a heat generating device disposed in the heat-sensing part.

If this is done, the response delay that has been a problem in the past can be eliminated by performing linear control of the valve under specified conditions that conform much more closely to actual conditions, so that the cooling water is maintained at the required temperature, thus making it possible to realize high cooling water temperature tracking characteristics with a high degree of precision at a low cost. As a result, the cooling water temperature can be [controlled] appropriately and efficiently in accordance with the load of the engine in the engine operating conditions, and this system is also superior in terms of response characteristics and stability of the cooling water temperature. Moreover, there is no danger of overshooting, undershooting, hunting or the like, and the cooling water temperature can be appropriately controlled to a high water temperature or low water temperature. In addition, a more reliable improvement in fuel consumption can be achieved, and this can be achieved throughout substantially the entire range of operating conditions.

An electronically controlled thermostat control method according to another embodiment of the present invention is characterized in that the abovementioned control controller comprises control that links the abovementioned actuator control to the control of auxiliary devices attached to the abovementioned engine when the abovementioned actuator requires considerable powering.

If this is done, a reduction in fuel consumption as seen from the vehicle as a whole can be appropriately achieved. Here, "control that links the powering of the actuator to auxiliary devices" refers to control which temporarily cuts off or restricts the supply of electric power to auxiliary devices in cases where the power consumption of the actuator comprising a PTC, electric motor or the like is large, so that the fuel consumption rate or engine powering would show a deterioration due to the considerable consumption of electric power if auxiliary devices were also simultaneously operated.

An electronically controlled thermostat control method according to yet another embodiment of the present invention is characterized in that the abovementioned control controller comprises control that automatically determines PI control coefficients used in the control of said electronically controlled thermostat in accordance with the layout of different engines or cooling water circulation systems.

If this is done, thermostat control can be performed more in accordance with actual conditions. Specifically, there is variation in the cooling system layouts and thermostats in the respective automobiles mounting the thermostat of the present invention, so that the PI (or PID) control coefficients used in the control of the electronically controlled thermostat show individual variation. Therefore, they have to be installed individually since a conformity corresponding to the individual difference is necessary. Accordingly, considering the variation in thermostats and the like, it is advisable to perform a control operation that automatically calculates the abovementioned control coefficients in accordance with individual differences.

An electronically controlled thermostat control method according to yet another embodiment of the present invention is characterized in that the abovementioned control controller comprises control that cuts the powering of the actuator in cases where the temperature difference between an arbitrarily set cooling water temperature and the cooling water temperature following the application of control is equal to or less than a specified value.

If this is done, power consumption can be reduced in the control of the thermostat.

An electronically controlled thermostat control method according to still another embodiment of the present invention is characterized in that the abovementioned control controller comprises control that judges whether the driver is a person who commonly uses a high engine load or a person who commonly uses a low engine load, and varies the set water temperature [accordingly].

If this is done, control of the thermostat can be performed more appropriately in accordance with actual conditions. Here, "control that varies the set water temperature according to the driver" is accomplished by monitoring the variation in the engine load applied by the driver for a fixed time period, and calculating the mean value of the load. Specifically, if this mean value of the load exceeds a certain fixed value, the driver is judged to be a driver who commonly uses a high load, and the set water temperature is lowered. On the other hand, if the mean value of the load is less than this certain fixed value, the driver is judged to be a driver who commonly uses a low load, and the set water temperature is raised.

An electronically controlled thermostat control method according to still another embodiment of the present invention is characterized in that the abovementioned actuator is a WAX type thermo-element with a heat generating device attached, the abovementioned control controller detects or calculates the difference between the actual flow rate and target flow rate of the cooling water, and the abovementioned control controller corrects the hysteresis in the heat radiation amount of the thermo-element and the parts that drive the abovementioned valve.

In this invention, the poor water temperature control characteristics that have been a problem in the past can be eliminated by performing linear control of the valve under specified conditions that conform much more closely to actual conditions, so that the cooling water is maintained at the required temperature, thus making it possible to realize high cooling water temperature tracking characteristics with a high degree of precision at a low cost. As a result, the cooling water temperature can be [controlled] appropriately and efficiently in accordance with the load of the engine in the engine operating conditions, and this system is also superior in terms of response characteristics and stability of the cooling water temperature. Moreover, there is no danger of overshooting, undershooting, hunting or the like, and the cooling water temperature can be appropriately controlled to a high water temperature or low water temperature. In addition, a more reliable improvement in fuel consumption can be achieved, and this can be achieved throughout substantially the entire range of operating conditions.

Here, "correction for the amount of heat radiation of the element" is a correction in which the amount of heat radiation from the thermo-element into the cooling water is predicted, and the power is increased or decreased so that heat corresponding to this amount of heat radiation is made up by the heat-radiating element in order to ensure that heat corresponding to the amount of heat escaping by heat radiation is securely absorbed by the expansion body (WAX), thus eliminating the effects of heat radiation. If such a correction is performed, the water temperature control characteristics such a hunting, water temperature control width and the like can be improved.

Furthermore, correction of the hysteresis in the mechanical driving parts is performed in the following cases. For example, there is a region in which the amount of valve opening does not change even during switching from an open valve to a closed valve or from a closed value to an open valve, or even if the powering is gradually increased or decreased, as a result of hysteresis that occurs in the mechanical driving parts for structural reasons during the opening and closing of the valve. The reason for this is that time is required for the abovementioned mechanical driving parts of the valve to begin to move in relation to the fixed side. Accordingly, a correction is performed by increasing or decreasing the powering of the PTC by an extra amount during the switching of the valve "from an open valve to a closed valve" or "from a closed valve to an open valve", so that the system is not affected by this region.

An electronically controlled thermostat control method according to still another embodiment of the present invention is characterized in that the abovementioned control controller has means for predicting the radiator flow rate by detecting parameters other than the radiator flow rate, such as the element lift, temperature of the heat generator, temperature of the temperature sensor or the like.

Here, "means for predicting the radiator flow rate" refers to the calculation of the target lift amount instead of the target flow rate by feeding back the element lift amount when the powering of the actuator is determined. Alternatively, this refers to the calculation of the target flow rate by feeding back the temperature of the heat generator of the heat generating device or the temperature of the temperature sensor.

By doing this, it is possible to control the cooling water temperature with a high degree of precision without sensing the radiator flow rate.

An electronically controlled thermostat control method according to still another embodiment of the present invention is characterized in that the abovementioned control that corrects the abovementioned element lift by predicting the amount of deterioration in the element lift.

By doing this, it is possible to eliminate the response delay even more decisively, and to perform control of the cooling water temperature with a high degree of precision over a long period of time. Here, "correction that predicts the deterioration in the amount of element lift" refers to the following correction: namely, as a result of deterioration of the element over time, the water temperature control characteristics deteriorate compared to the initial characteristics (e.g., water temperature hunting occurs, the water temperature control width is increased and the like); accordingly, the amount of deterioration in the lift of the element is predicted from the amount of increase in overshooting or the difference from the initial water temperature gradient, and the powering is increased or decreased so that the effects of this amount of deterioration are eliminated.

An electronically controlled thermostat control method according to still another embodiment of the present invention is characterized in that the abovementioned control controller judges that the abovementioned electronically controlled thermostat has malfunctioned in cases where the measurement of the resistance value of the abovementioned heat generating device at the time that the abovementioned engine is started indicates that the difference between this resistance value and a pre-stored reference resistance value is equal to or greater than a specified value.

If this is done, the electronically controlled thermostat can be appropriately and reliably controlled.

Thus, the cooling water temperature control system of an automobile engine that includes an electronically controlled thermostat using the control method of the present invention has a construction comprising an electronically controlled thermostat with a structure that allows arbitrary water temperature control, a water temperature sensor that senses the actual water temperature in the cooling water system, and a control controller that performs correction calculations for the purpose of controlling the cooling water to a set water temperature and the like. This system is constructed so that a sensor that detects the flow rate in the cooling water system, a sensor that detects the lift of the thermo-element, a temperature sensor that detects the WAX or heat-radiating element used as an expansion body or the like is appropriately used.

EXPLANATION OF SYMBOLS

1 Automobile engine used as engine, 2 Radiator (Rd) used as heat exchanger, 3 Outflow side cooling water passage, 4 Inflow side cooling water passage, 5 Bypass water passage, 10 Valve unit used as electronically controlled thermostat which functions as water distribution valve, 11, 12 Water temperature sensors, 20 Controller comprising control device (ECU: engine control unit), 21 Radiator flow rate sensor (Rd flow rate sensor), 22 Lift sensor, 23 PTC temperature sensor, 24 WAX temperature sensor.

BEST MODE FOR CARRYING OUT THE INVENTION

Figure 1:
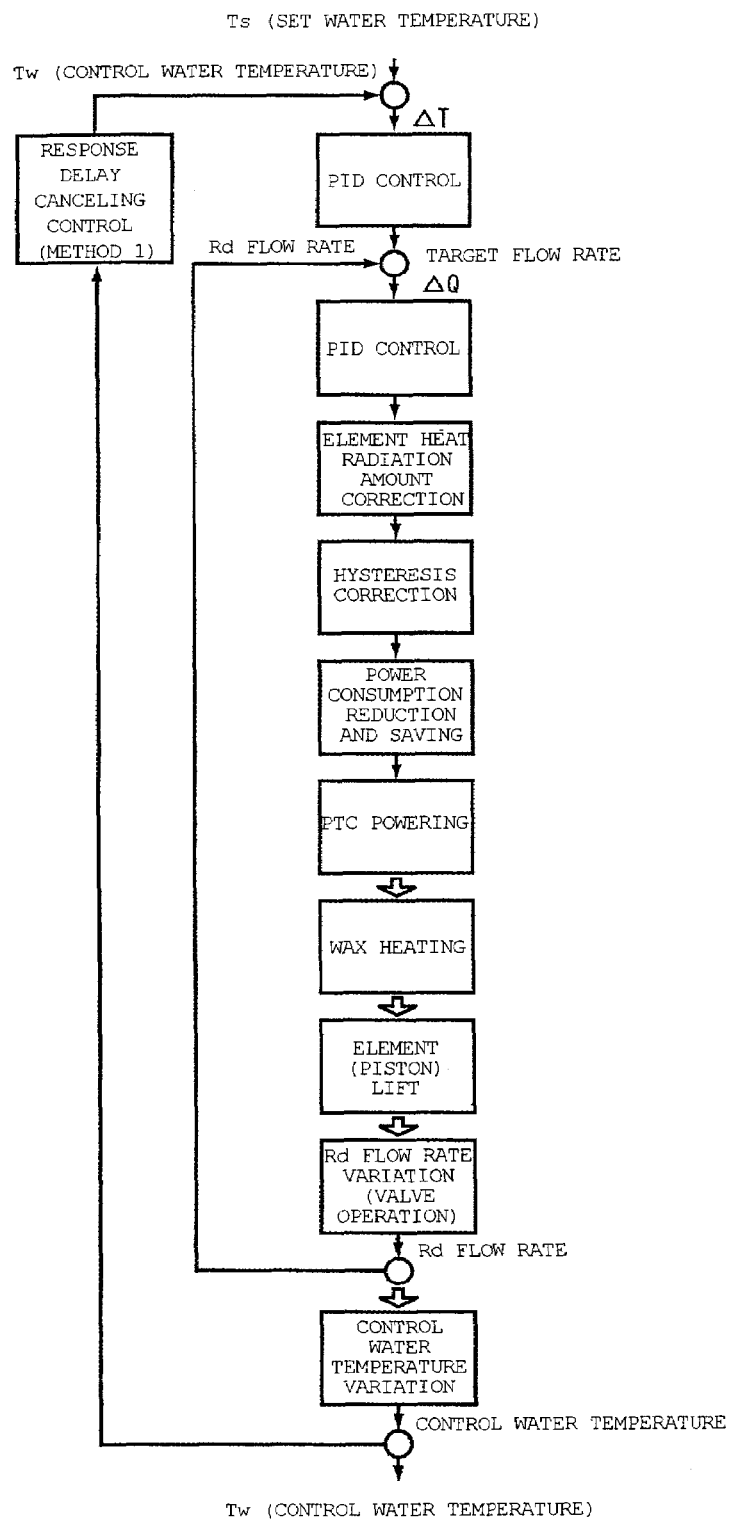
FIG. 1 is a control block diagram of a system equipped with an Rd low rate sensor which shows one embodiment of the electronically controlled thermostat control method of the present invention.
Figure 2:
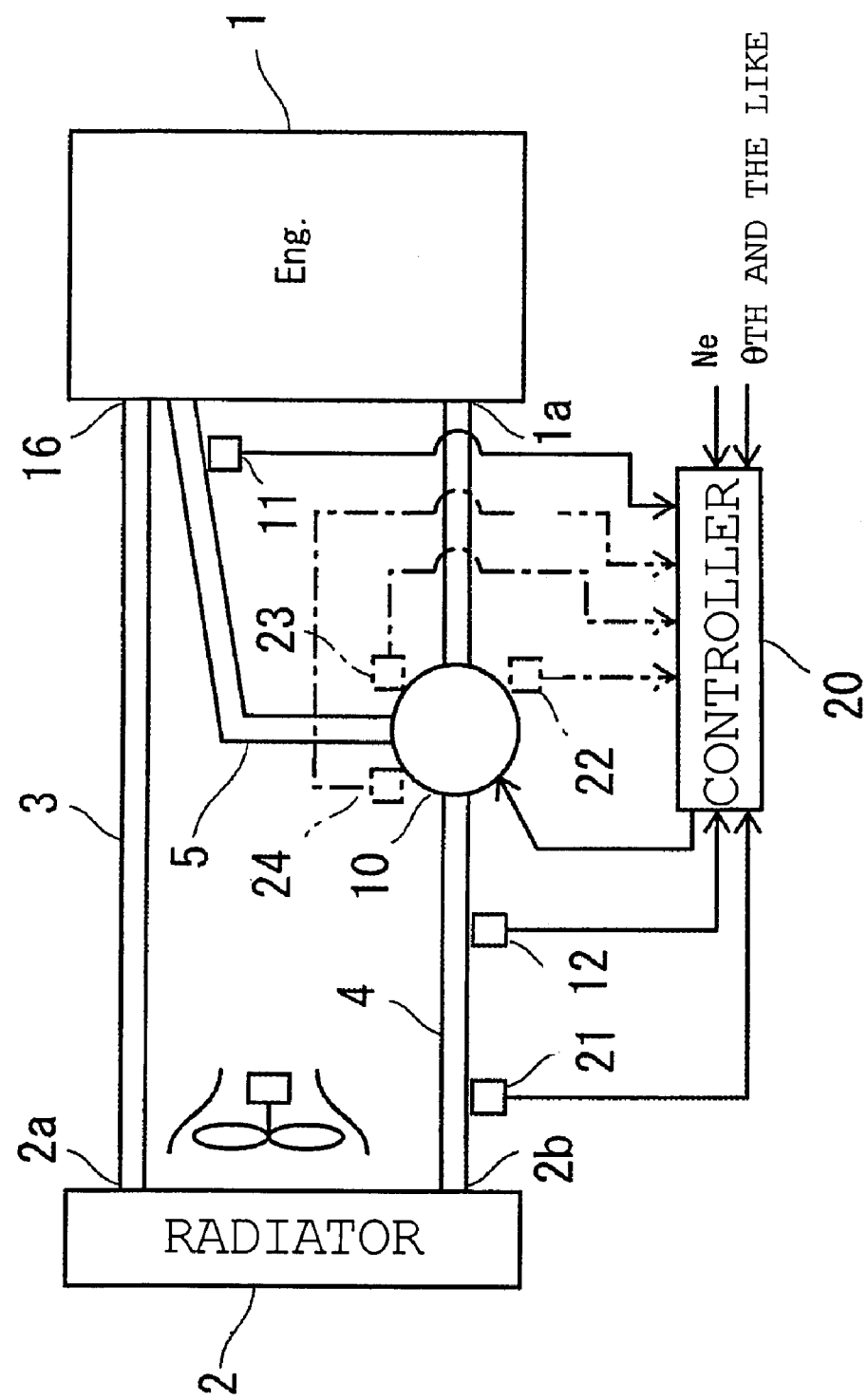
FIG. 2 is a schematic diagram used to illustrate the cooling water temperature control system of an engine using the electronically controlled thermostat control method of the present invention.

FIGS. 1 and 2 show one embodiment of the electronically controlled thermostat control method of the present invention.

In these figures, a description will first be presented below on the basis of FIG. 2, which shows an overall outline of the cooling water temperature control system of an automobile engine that includes an electronically controlled thermostat.

In FIG. 2, 1 indicates an automobile engine used as the engine [in the present system]; a universally known cooling water passage (not shown in the figures) is formed inside this engine 1.

2 indicates a heat exchanger, i.e., a radiator (Rd). A universally known cooling water passage is also formed inside this radiator 2; furthermore, the cooling water inlet pat 2a and cooling water outlet part 2b of the radiator 2 are connected to cooling water passages 3 and 4 that circulate cooling water between [the radiator 2] and the abovementioned engine 1.

The cooling water passage is constructed from an outlet side cooling water passage 3 that communicates between a cooling water outlet part 1b disposed in the upper part of the engine 1 and a cooling water inlet part 2a disposed in the upper part of the radiator 2, and an inlet side cooling water passage 4 that communicates between a cooling water outlet part 2b disposed in the lower part of the radiator 2 and a cooling water inlet part 1a disposed in the lower part of the engine 1. Furthermore, a bypass water passage 5 which forms a "short-circuit" connection between the cooling water passages 3 and 4 is provided, and a valve unit 10 used as an electronically controlled thermostat that functions as a water distribution valve is disposed in the confluence part where this bypass water passage 5 joins the abovementioned cooling water passage 4.

For example, this valve unit 10 has a construction of the type disclosed in the abovementioned Patent Reference 1 or the like. The valve is constructed from a thermo-element with a mechanism that senses the temperature of the cooling water and causes the extension of a piston by the expansion of WAX that is mounted inside, a main shaft which is connected to the tip end portion of the piston via a connecting member, and a main valve body and bypass valve body supported on this main shaft.

Furthermore, a heat generating element is attached to the head part of the thermo-element in a location that does not contact the cooling water. The valve can be controlled by powering this heat generating element. For example, on the basis of output signals from the control controller in accordance with the engine operating conditions, the valve can be opened early in cases where the cooling water temperature is high when the engine load is increased. Furthermore, control of the engine itself (such as cooling of the engine by increasing the amount of lift to an amount that is greater than usual or the like) is also possible, and the degree of opening of the valve can be arbitrarily varied without depending on the actual temperature alone.

Furthermore, heat generating elements that can be used include nichrome wires, PTC elements, Peltier elements and the like; such elements can be selected in accordance with the application involved.

Moreover, an engine cooling water circulation passage is formed by the abovementioned engine 1, radiator 2, cooling water passages 3 and 4 and the like.

A water temperature sensor 11 such as a thermistor or the like is disposed in the outflow side cooling water passage 3 near the cooling water outflow part 1b in the abovementioned engine 1 (here, in a portion of bypass passage 5 which is in a comparable location). The detection value obtained by this water temperature sensor 11, i. e., information relating to the water temperature on the engine outlet side, is sent to the controller 20 which comprises a control device (ECU: engine control unit), so that the flow of the cooling water can be appropriately controlled in accordance with the operating conditions of the engine 1 and the like.

In the abovementioned cooling water passage 4 on the inflow side, a water temperature sensor 12 which detects the water temperature on the outlet side of the radiator 2 is disposed on the upstream side of the valve unit 10. The detection value of this water temperature sensor 12 is also sent to the controller 20.

Furthermore, the system is devised so that this controller 20 also controls the fan motor of a cooling fan which is attached to the abovementioned radiator 2 and used for the forcible air cooling of the cooling water.

Furthermore, although details are not shown in the figures, information indicating the operating conditions of various parts such as the engine 1, radiator 2 and the like, e. g., Ne (engine rpm), θth (degree of throttle opening) and the like, are also sent to the controller 20.

In the above construction, the valve unit 10 based on an electronically controlled thermostat appropriately controls the cooling water temperature in accordance with the load of the engine 1 in the automobile operating conditions.

In the present invention, as a result of the installation of a radiator flow rate sensor (hereafter referred to as the "Rd flow rate sensor") 21 in the inflow side cooling water passage 4 that leads from the radiator 2 to the engine 1 in the abovementioned cooling water temperature control system, control of the cooling water temperature is performed as shown in FIG. 1.

Specifically, in a conventional structure, control of the cooling water temperature is accomplished by PID (or PI) control on the basis of the temperature difference between the cooling water passages 3 and 4. As a result, the powering of the heat generating element (e.g., PTC) is simply controlled. Accordingly, since the variation in the powering of the heat generating element and the Rd flow rate on the radiator side are not proportional, hunting occurs, and the water temperature control width is increased, thus leading to the problem of poor water temperature control characteristics. Consequently, in order to solve this problem, the target radiator flow rate (target Rd flow rate) is calculated by the amount of PID (or PI) control on the basis of the temperature difference, and various corrections are added to this target Rd flow rate to achieve stabilization, so that feedback control is performed as shown in FIGS. 1, 3 and 4.

FIG. 1 is a control block diagram of a system in which a heat generating device and an Rd flow rate sensor 21 are installed in a conventional thermostat in the actuator. Here, a heat generating element is used as the heat generating device. Specifically, in the process of heat generation by the powering of the heat generating element disposed inside the thermostat, the difference ΔT between the actual water temperature and set water temperature of the cooling water is detected, and the target flow rate is calculated by PID control. Then, after the difference ΔQ between the actual flow rate and target flow rate is detected, further PID control is performed so that a correction of the amount of heat radiation by the element, a correction of the hysteresis in the mechanical driving parts, a correction that suppresses power consumption and the like are added, and the powering of the heat generating element is determined. In this way, the system is constructed so that control is performed which eliminates the response delay (time lag) from the determination of the powering of the heat generating element to the time at which the actual water temperature is reached, and which also eliminates water temperature hunting and the like. In this process, the target Rd flow rate is calculated, this is compared with the actual Rd flow rate and adjusted, and feedback control is performed.

Furthermore, instead of an Rd flow rate sensor, it would also be possible to use the element lift (which allows easy prediction of the Rd flow rate), temperature of the PTC and WAX constituting the heat generating device or the like, and to use these values as another type of feedback information.

Figure 3:
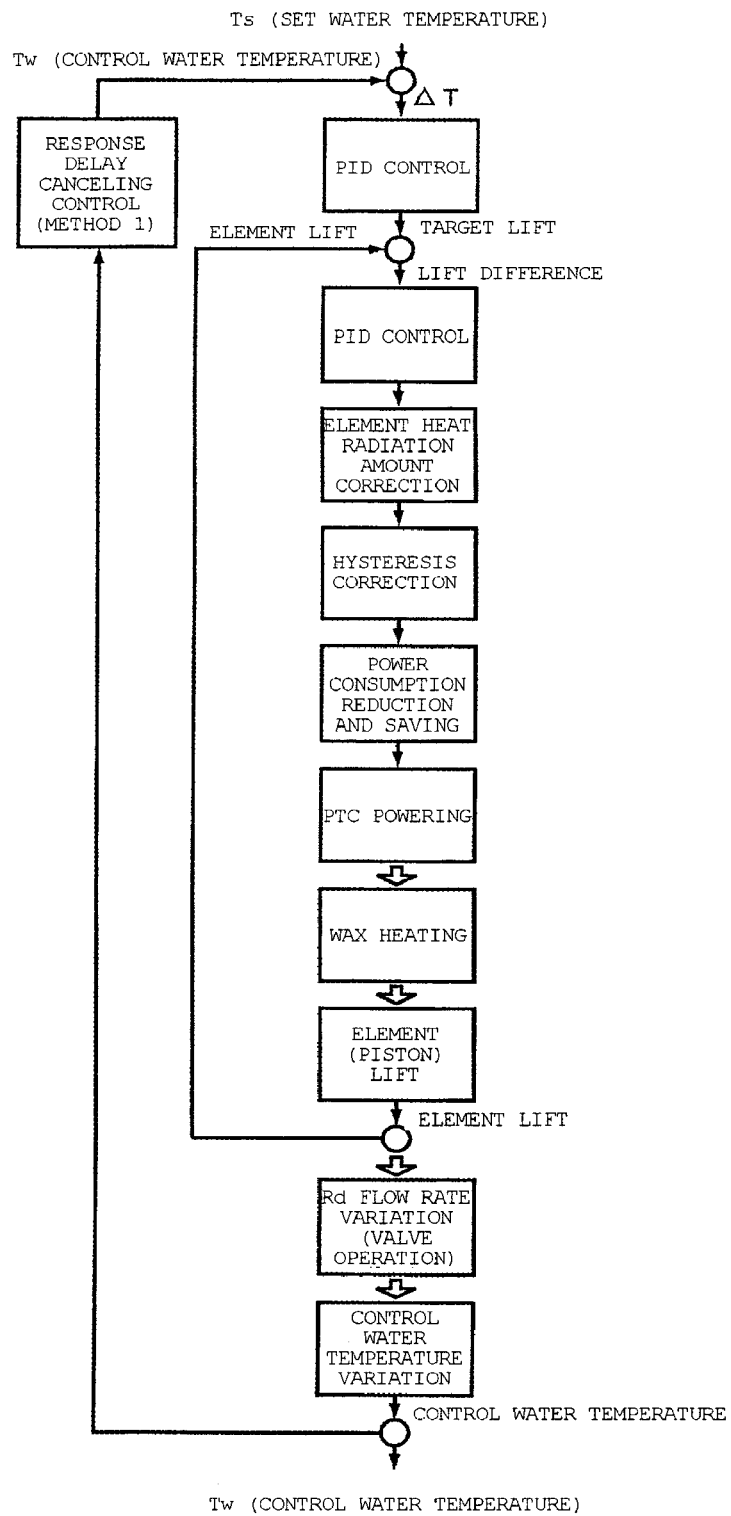
FIG. 3 is a control block diagram which shows a modification of the system shown in FIG. 1.
Figure 4:
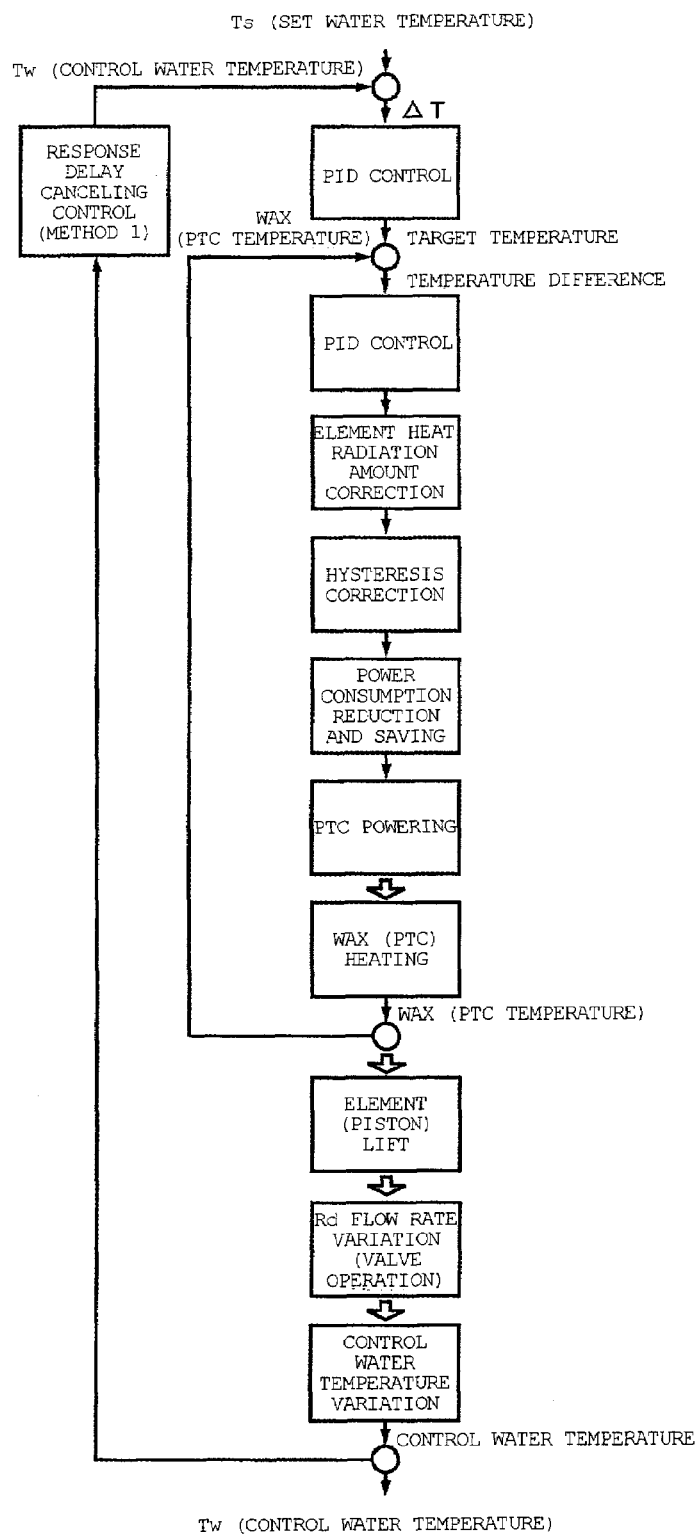
FIG. 4 is a control block diagram which shows a modification of the systems shown in FIGS. 1 and 3.

Specifically, in cases where an Rd flow rate sensor 21 cannot be attached or the like, a lift sensor 22 that detects the amount of lift of the element and a PTC temperature sensor 23 or WAX temperature sensor 24 that detects the temperature of the PTC or WAX are installed in the valve unit 10 constituting the electronically controlled thermostat as indicated by the imaginary lines in FIG. 2, and the control shown in FIG. 3 or FIG. 4 is performed using these detection values.

FIG. 3 shows a case in which the abovementioned lift sensor 22 is used to calculate the target lift amount instead of the abovementioned target Rd flow rate, and the element lift amount thus determined is fed back.

FIG. 4 shows a case in which the PTC temperature sensor 23 or WAX temperature sensor 24 is used to calculate the target temperature instead of the abovementioned target Rd flow rate, and the PTC or WAX temperature thus determined is fed back.

If this is done, sensing of the radiator flow rate, i. e., the radiator flow rate sensor, can be eliminated.

Furthermore, in the abovementioned FIGS. 1, 3 and 4, the PID calculation results are added and subtracted, multiplied and divided; however, it would also be possible to alter the PID control constants instead.

In cases where a PTC is used as the heat generating element in performing cooling water temperature control by the abovementioned steps, it is advisable to use a constant-current circuit as the heat generating circuit that powers the PTC. Specifically, in cases where a PTC and WAX element (this may also be a bimetal or shape memory alloy SMA) are combined with the heat generating device of the actuator in the electronically controlled thermostat (valve unit 10), it is ideal for maintaining the amount of valve opening that it be possible to maintain the quantity of heat that is generated by the PTC at a constant value in a structure in which the valve is opened by heating the WAX element with the PTC.

Conventionally, however, since a constant-voltage circuit is used as the PTC powering circuit, the resistance varies with the temperature rise of the PTC itself even if the same voltage is applied, so that the powering also varies, resulting in a fluctuation in the amount of valve opening so that there is an increase in water temperature hunting and the water temperature control width, and thus a deterioration in the water temperature control characteristics.

Figure 5:
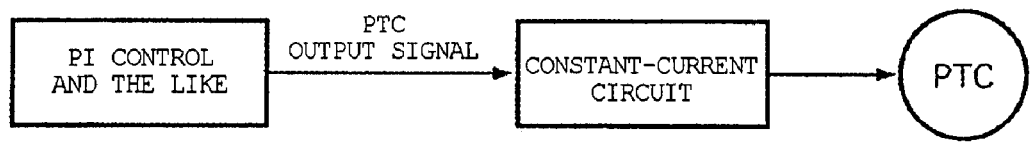
FIG. 5 is a diagram which is used to illustrate the heat-generating circuit of the PTC.

Stable powering can be ensured, and control of the amount of heat generated by the PTC can be facilitated, by using a constant-current circuit as the PTC powering circuit as shown in FIG. 5, and thus canceling the powering variation characteristics caused by the variation in the temperature of the PTC itself, in order to solve this problem.

Furthermore, in the control block diagrams shown in FIG. 1 or FIGS. 3 and 4, "correction of the amount of heat radiation by the element" refers to a correction in which the amount of heat radiation from the thermo-element into the cooling water is predicted, and the powering is increased or decreased so that heat corresponding to this amount of heat radiation is made up by the PTC in order to ensure that heat corresponding to the amount of heat escaping by heat radiation is securely absorbed by the expansion body (WAX), thus eliminating the effects of heat radiation.

Figure 6:
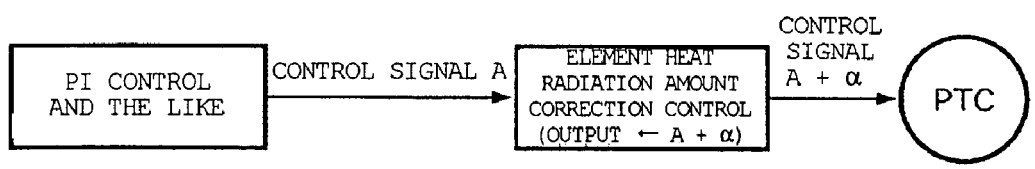
FIG. 6 is a diagram which is used to illustrate the element heat radiation amount correction control in FIG. 6.

Specifically, in cases where the element that is heated by the PTC is disposed in the cooling water, or a portion of the element is disposed in a position that contacts the cooling water, the heat that is generated is constantly radiated into the cooling water that flows through the surrounding area. In cases where this amount of heat radiation is large, the amount of valve opening cannot be maintained even if the same powering is applied to the PTC; as a result, the water temperature control characteristics show a deterioration. In order to solve this problem, means for predicting the amount of heat radiation from the element into the cooling water are provided as shown in FIG. 6, and the powering is increased or decreased so that heat corresponding to this amount of heat radiation can be supplemented by the PTC. As a result, even if the amount of heat that is radiated into the cooling water from the element increases or decreases, the effect of this on the amount of valve opening can be eliminated.

Furthermore, in this correction control of the amount of element heat radiation, the amount of heat radiation that is required in this case is extracted from an element heat radiation correction amount map with respect to Ne, and this is added to the PTC powering. Besides a method of simple prediction from Ne, the prediction of the element heat radiation amount can also be accomplished by performing higher-precision predictions using Ne and the outside air temperature, radiator outlet side water temperature, engine load and the like.

Figure 7:
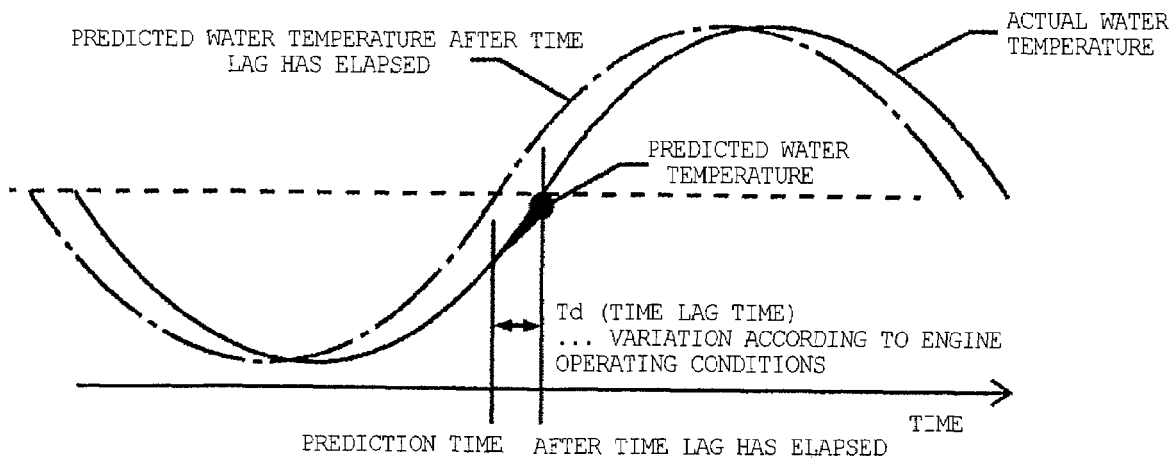
FIG. 7 is a graph which is used to illustrate the correction control of the response delay.

Canceling control of the response delay is performed as follows: specifically, when problems such as overshooting, undershooting, hunting and the like occur as a result of such a response delay, problems in terms of the durability of the water cooling system and engine parts, a deterioration in fuel consumption and the like arise. In order to solve such problems, it is advisable to provide means for predicting the water temperature following the passage of the time lag, and to eliminate the time lag (at least in approximate terms) by controlling the valve in advance in accordance with the predicted water temperature following the passage of the time lag as shown in FIG. 7.

Here, the "predicted water temperature following the passage of the time lag" is the water temperature used for control; if control is performed in advance using this water temperature, the PTC powering required following the passage of the time lag can be set in advance, so that this powering is reflected following the passage of the time lag.

In this step, first of all, the predicted water temperature following the passage of the time lag is calculated from the water temperature obtained from the sensor and the amount of variation in the water temperature per unit time.

Here, the precision can also be further increased if the variation in the water temperature variation is calculated.

Figure 8:
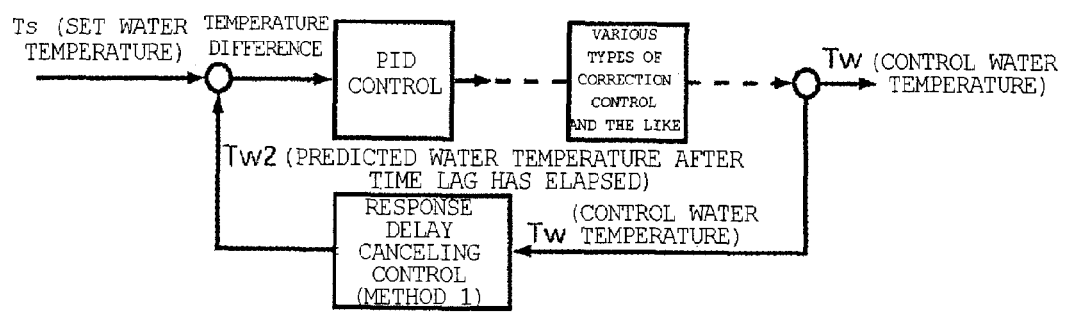
FIG. 8 is a diagram which is used to illustrate the feedback control of the predicted water temperature following the passage of the time lag.

Next, it is advisable to subject the predicted water temperature thus determined to PID control or the like that determines the original amount of powering. This is shown in FIG. 8.

Furthermore, in addition to a method in which the water temperature following the passage of the time lag is predicted from the time lag time Td (i.e., the time period extending from the alteration of the powering to the point in time at which the water temperature is fed back), it would also be possible to detect this with higher precision by adding the variation in the radiator outlet side water temperature, the engine load or the like. For example, since the flow velocity of the cooling water is proportional to Ne, Ne can be used as a parameter in the calculations for the variation in the time period extending from the variation in the powering to the variation in the water temperature. Furthermore, if the time period extending from the powering variation to the water temperature feedback is measured each time, and the time lag time Td is determined on the basis of these values, deterioration in the element or the like over time can also be handled. Moreover, higher-precision time lag detection means may also be used in which a water temperature sensor is disposed in the mixing [area], and the time period extending from powering to the opening of the valve is measured.

In the abovementioned method, canceling of the time lag is realized by changing the water temperature used as a control reference to the calculated water temperature following the passage of the lag time; however, the same action can also be realized by substituting the target water temperature as shown below.

Next, the substitution method of this target water temperature Ts will be described.

Specifically, the water temperature following the passage of the time lag is first calculated from the water temperature variation read in from the sensor.

Figure 9:
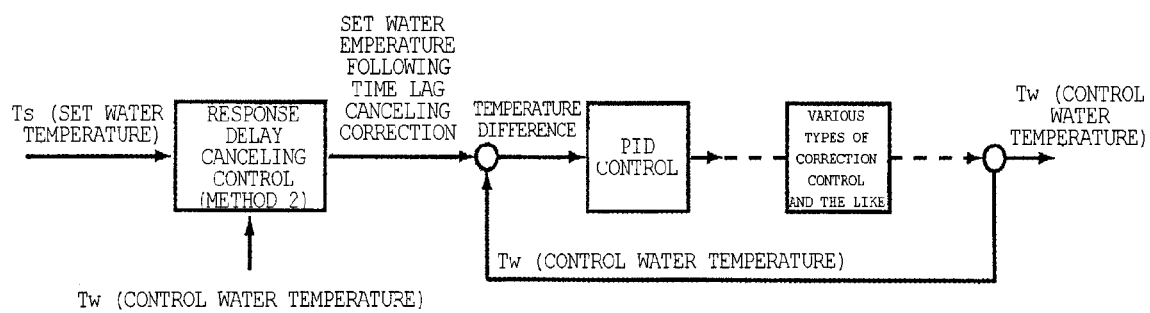
FIG. 9 is a diagram which is used to illustrate another example of the control shown in FIG. 8.

Then, as is shown in FIG. 9, this determined water temperature variation can be subtracted from the set water temperature, and PID control can be performed so that the value conforms to this set water temperature.

Here, it will be understood that the flow of the control process is the opposite in the case of overshooting and in the case of undershooting.

Figure 10:
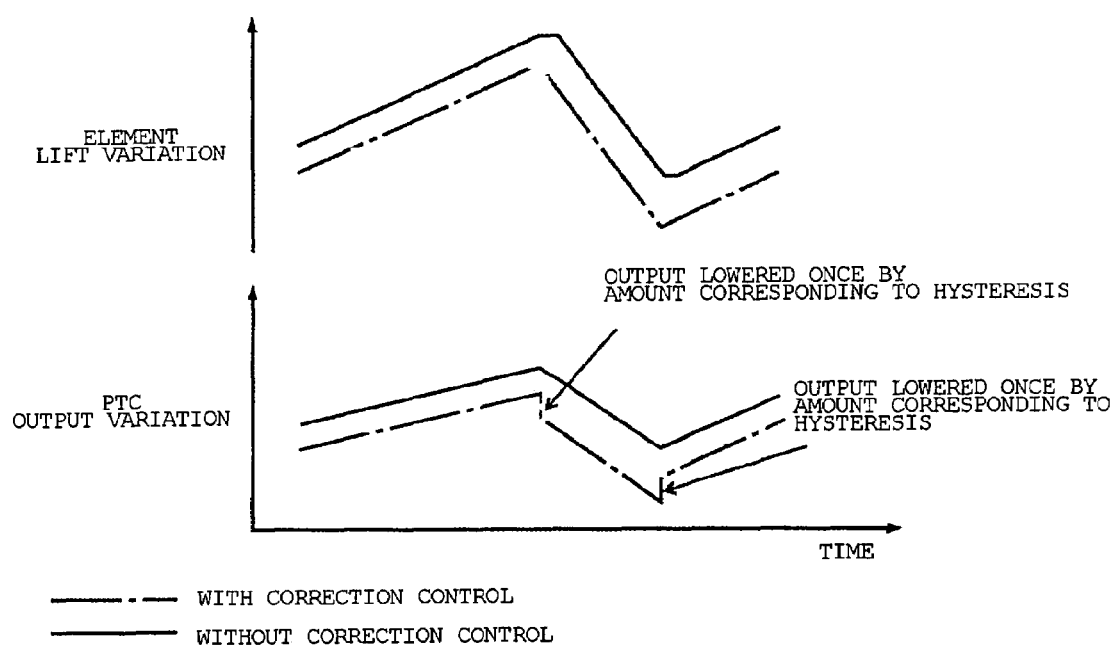
FIG. 10 is a graph which is used to illustrate the correction control of the hysteresis in mechanical driving parts.

Furthermore, correction of the hysteresis in the mechanical driving parts is performed in the following cases. For example, there is a region (insensitive band) in which the amount of valve opening does not change even during switching from an open valve to a closed valve or from a closed value to an open valve, or even if the powering is gradually increased or decreased, as a result of hysteresis that occurs in the mechanical driving parts for structural reasons during the opening and closing of the valve. The reason for this is that time is required for the abovementioned mechanical driving parts of the valve to begin to move in relation to the fixed side. Accordingly, it is advisable to perform a correction by increasing or decreasing the powering of the PTC by an extra amount (base up or base down) as shown for example in FIG. 10 during the switching of the valve "from an open valve to a closed valve" or "from a closed valve to an open valve", so that the system is not affected by this region.

Here, it will be understood that in an electronically controlled thermostat based on a system using a flow rate control valve such as a butterfly valve driven by an electric motor or the like, the element lift variation can be established by substituting the valve variation or PTC output variation for the actuator output variation.

Furthermore, "correction that suppresses power consumption" is accomplished by stopping the powering of the PTC (powering of the actuator or the like) in cases where the temperature difference between the set water temperature and the control water temperature is equal to or less than a certain fixed value.

Specifically, in cases where the set water temperature is brought to approximately the same temperature as the valve opening temperature of the thermostat, the PTC is constantly left in a powered state, so that power consumption increases, thus leading to an increase in fuel consumption and a drop in output.

Figure 11:
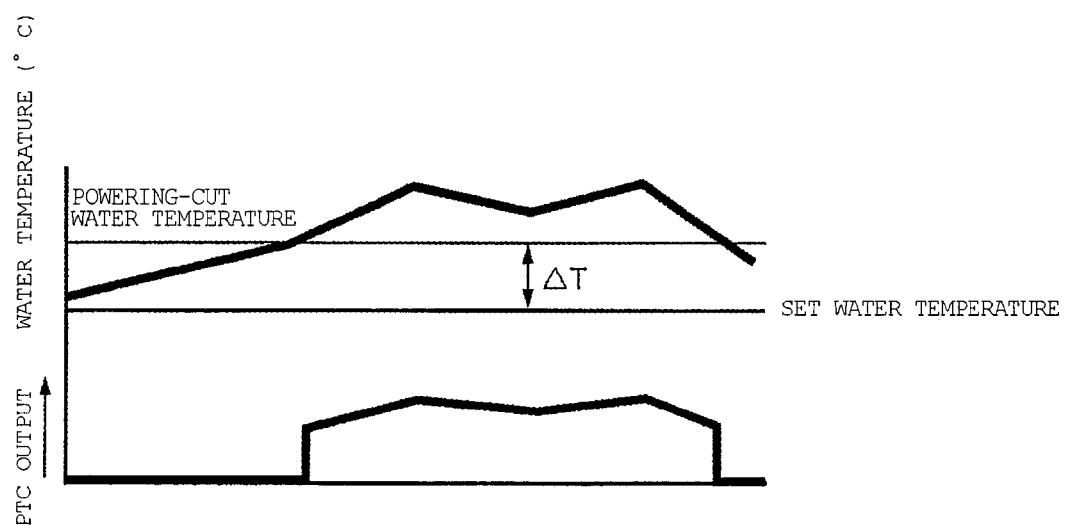
FIG. 11 is a graph which is used to illustrate the power consumption reduction control.

Accordingly, as is shown in FIG. 11, in cases where the temperature difference ΔT between the set water temperature and the control water temperature is equal to or less than a certain value, the powering of the PTC is completely stopped. Of course, a method in which the set water temperature is raised so that the amount of powering is reduced may also be used.

Furthermore, in cases where cooling water temperature control is performed using a system in which a heat generating device is disposed in the abovementioned WAX type thermostat, and the resistance value varies when the heat generating device is powered (e.g., a PTC, nichrome wire or the like), it is advisable from the standpoint of stability to judge malfunctioning of the thermostat by measuring the resistance value of the PTC, nichrome wire or the like when the engine is started, and determining whether or not this value is within a standard range.

Furthermore, in performing such cooling water temperature control, it is desirable from the standpoint of the overall automobile system to perform control that is linked to the auxiliary devices that are attached to the engine. Specifically, in cases where a large amount of powering is required by the PTC, it is advisable to perform control linked to the auxiliary devices by adding control that cuts off the operation of auxiliary devices such as air conditioning or the like, or that reduces the powering of the alternator or the like. If this is done, the fuel consumption rate and engine output can be ensured in cases where considerable power is consumed, as when the PTC power consumption is large, auxiliary devices are simultaneously operated or the like.

Furthermore, in performing the abovementioned cooling water temperature control, it is also necessary to judge whether the driver operating the automobile is a person who commonly uses the high engine output region or a person who commonly uses the low engine output region, and to vary the set water temperature [accordingly], in order to prevent a deterioration in fuel consumption or a drop in powering.

Specifically, in the case of conventional control, if the set water temperature is set in accordance with drivers who commonly perform low-load operation, the set water temperature is increased. Accordingly, in the case of drivers who commonly perform high-load operation, both the fuel consumption and engine output show a deterioration. The same is true in the opposite case.

Figure 12:
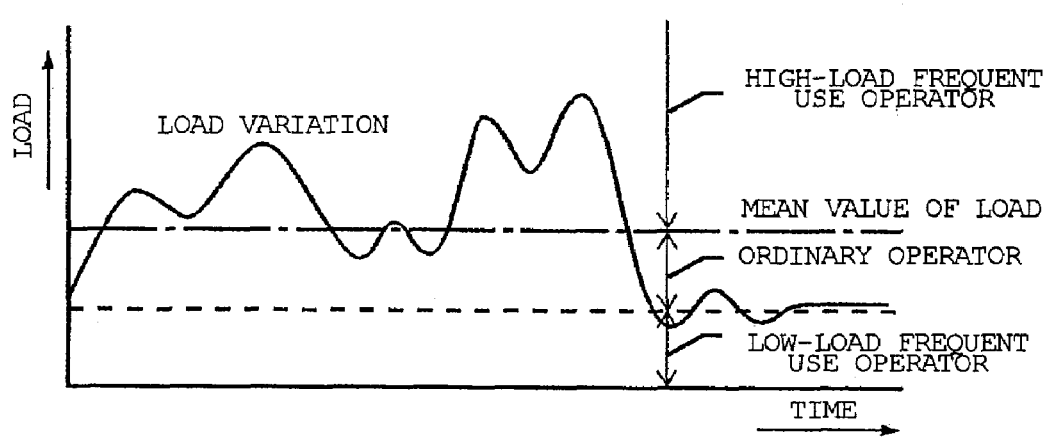
FIG. 12 is a graph which is used to illustrate the optimal water temperature setting control.
Figure 13:
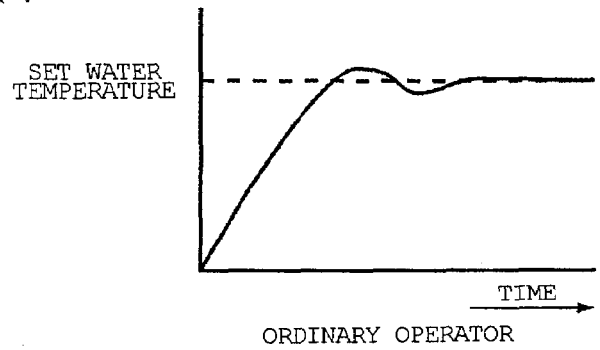
FIGS. 13(a), (b) and (c) are graphs which show water temperature control images with the set water temperature varied.
Figure 13:
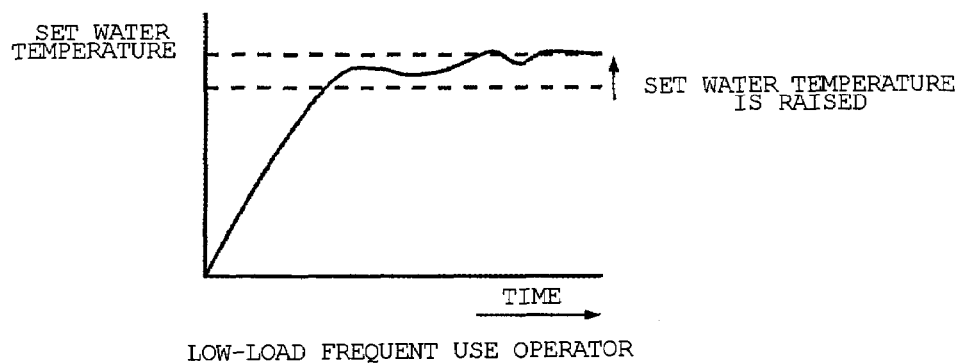
Figure 13:
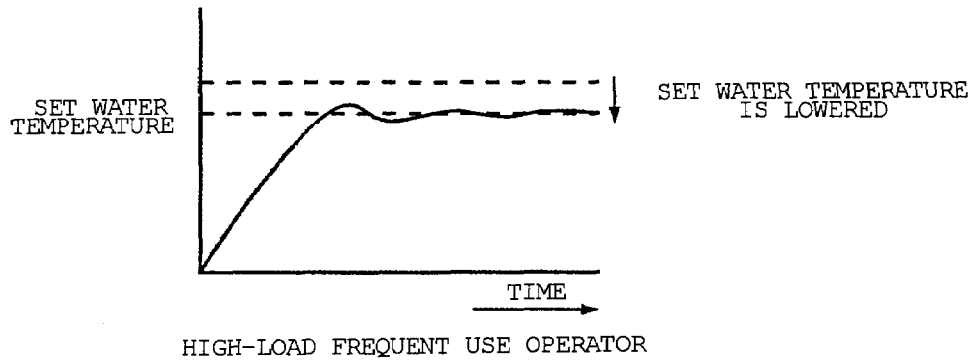

In order to solve such problems, as shown in FIG. 12 and FIG. 13, it is advisable to perform control in which the set water temperature varies according to the driver. Specifically, this is accomplished by monitoring the variation of the load in the case of a [given] driver for a fixed period of time, and calculating the mean value of the load. More specifically, if this mean value of the load exceeds a certain fixed value, the driver is judged to be a driver who commonly uses a high load, and the set water temperature is lowered. On the other hand, if the mean value of the load is less than this certain fixed value, the driver is judged to be a driver who commonly uses a low load, and the set water temperature is raised.

Furthermore, both the raising width and lowering width may be made proportional to the mean value of the load. Moreover, the shift to a low water temperature may be accelerated by altering the high load judgment criteria together with the set water temperature. Furthermore, a judgment may also be made according to the manner of depressing the accelerator pedal. It is conceivable that the system might also be endowed with a learning function in which this set water temperature is stored in memory, and the system is started from the same set water temperature the next time that the engine is started.

Furthermore, in performing the abovementioned cooling water temperature control, it is also desirable to perform a correction for the deterioration of the element lift over time. The reason for this is that a drop in the water temperature control characteristics compared to the initial characteristics as a result of deterioration of the element over time is unavoidable.

Figure 14:
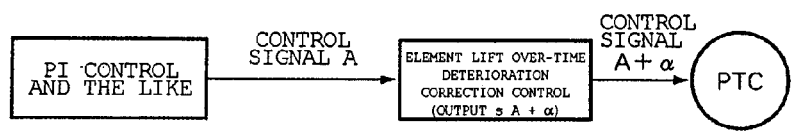
FIG. 14 is a diagram which is used to illustrate the correction control of the deterioration of the element over time.
Figure 15:
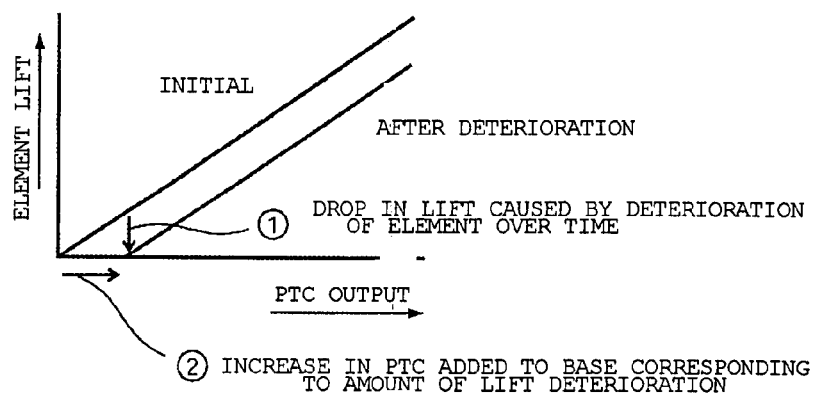
FIG. 15 is a graph which is used to illustrate the correction control of the deterioration of the element over time.
Figure 16:
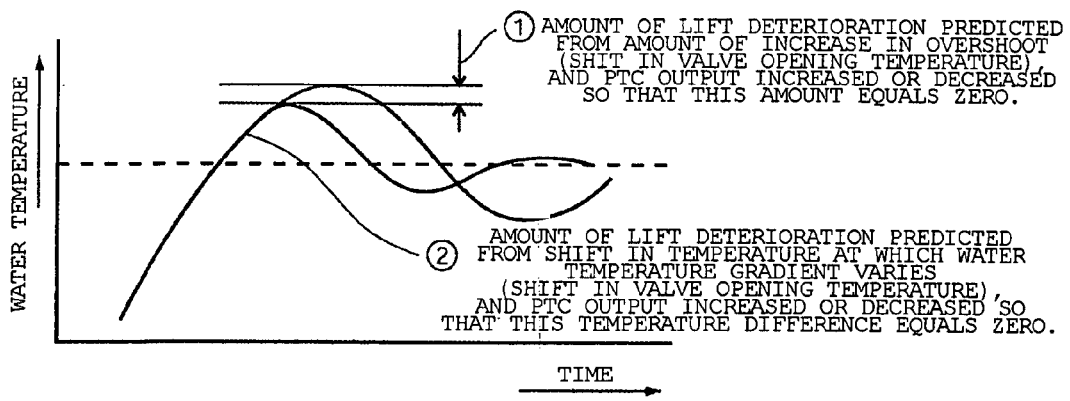
FIG. 16 is a graph which is used to illustrate the detection of the deterioration in the element lift.

Accordingly, it is advisable to provide means for predicting the amount of deterioration in the lift, and to perform control with the powering of the PTC increased so that compensation is made for this amount of deterioration, thus preventing a drop in lift caused by this deterioration in the lift. These conditions are shown in FIGS. 14, 15 and 16.

Here, in cases where control is performed using a correlation table of the amount of powering of the PTC and amount of lift, it is advisable to calculate the amount of correction with reference to this table.

Furthermore, in detecting the amount of deterioration in the element lift, the difference in the amount of water temperature overshooting or the temperature at which the water temperature again shifts to a drop after first rising is first compared with the initial state under certain operating conditions, the deviation of the valve opening temperature is detected, and the amount of deterioration in the lift is derived from this. Next, under certain operating conditions, the temperature at which the slope of the water temperature varies during the rise of the water temperature is compared with the initial state, the deviation of the valve opening temperature is detected, and the amount of deterioration in the lift is determined.

Furthermore, in the system that performs the abovementioned cooling water temperature control, it is necessary to match the PID (or PI) control constants according to differences in the thermostats of the respective vehicles in which the system is mounted. It is generally advisable that this matching be performed in the design stage; however, considering the variation in engine cooling water systems, the variation in valves and the like, some trouble in achieving appropriate control is unavoidable. Accordingly, it is desirable to devise the system so that the PI control constants can be automatically determined according to the vehicle in which the system is mounted following engine assembly, and so that automatic tuning can be performed.

Figure 17:
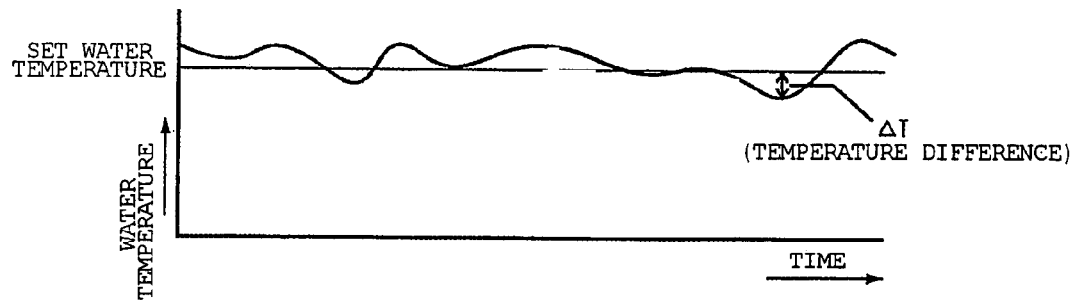
FIG. 17 is a graph which is used to illustrate the learning control of the PI value.

In this case, as is shown in FIG. 17, the mean value of the temperature differences during a fixed period of time is calculated, and the proportionality constants and integration constants are increased or decreased so that this mean value decreases. Appropriate proportionality and integration constants are set at the time of shipping. Furthermore, the mean temperature difference $\Delta T$ for a certain time period is measured, and the respective constants are preferably increased by 1.5 times with respect to the proportionality and integration constants in this case. Then, the mean temperature difference is measured again. In this case, if the mean temperature difference is smaller, the constants are again preferably multiplied 1.5 times with these proportionality and integration constants as a base. However, if the mean temperature difference is larger, the original values are preferably multiplied by 0.65 times, and the mean temperature difference is measured, so that the temperature difference is reduced. In this case, if the temperature difference is not reduced, it appears that the original values are the best proportionality and integration constants.

Furthermore, since there may also be cases in which the optimal proportionality and integration constants vary according to individual differences in the thermostats and changes over time, it is desirable that confirmation means of this type operate so that optimal values are constantly sought.

Furthermore, the present invention is not limited to the structures or numerical values described in the abovementioned embodiment; it goes without saying that the shapes, structures and the like of various parts may be appropriately altered or modified.

Specifically, the electronically controlled thermostat to which the present invention is applied may have any structure as long as this thermostat is capable of controlling the cooling water temperature to an arbitrary temperature. For example, besides WAX+PCT type thermostats or the like, it would also be possible to use an electronically controlled thermostat based on a system using a flow rate control valve such as a butterfly valve driven by an electric motor or the like. Furthermore, the heat generating device used is not limited to a heat generating element; any heat generating device may be used as long as this device comprises a heat generator such as a nichrome wire or a heat generator utilizing dielectric heating, induction heating, microwave heating or the like. Furthermore, the heat generating element is likewise not limited to a PTC; a Peltier element or the like may also be used. Furthermore, a bimetal or shape memory alloy (SMA) may be used instead of WAX.

Figure 18:
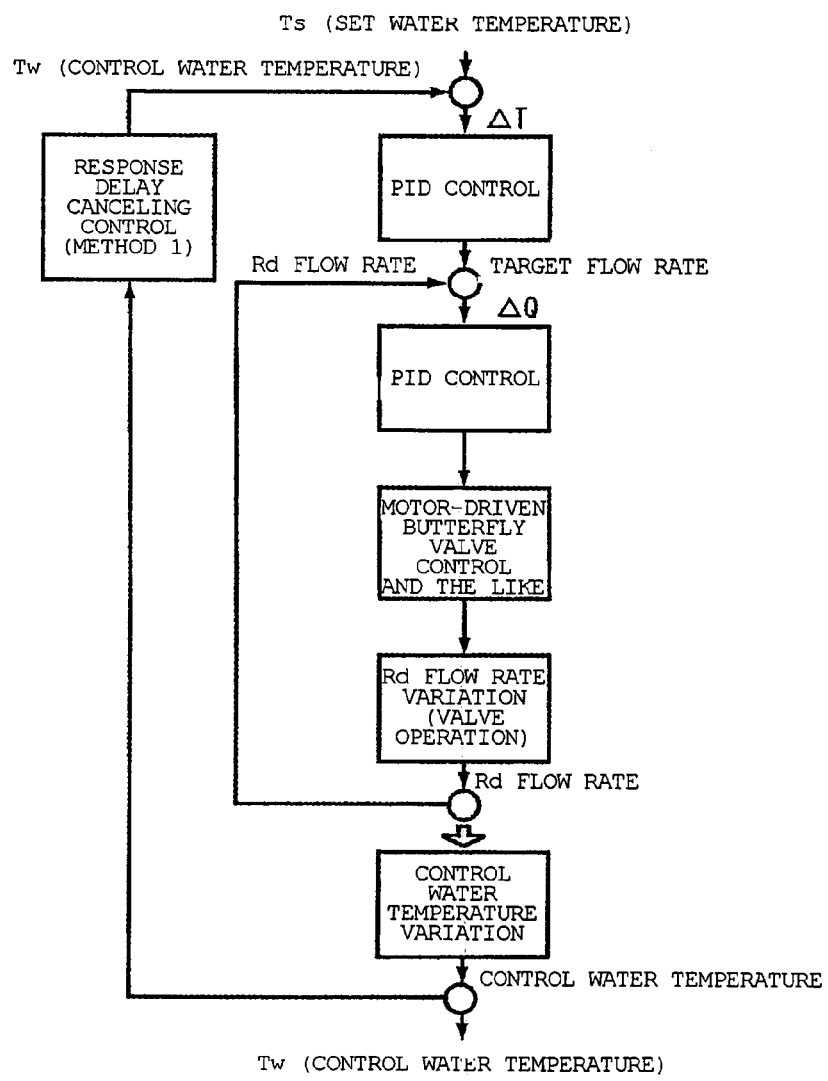
FIG. 18 is a control block diagram of a system using a flow rate control valve such as a butterfly valve driving by an electric motor or the like, which shows another embodiment of the electronically controlled thermostat control method of the present invention.

Here, FIG. 18 is a control block diagram showing a case in which the abovementioned butterfly valve driven by an electric motor or the like is used. In this figure, the system is constructed so that control is performed as follows: namely, the difference $\Delta T$ between the actual water temperature and target water temperature of the cooling water is detected, and the target flow rate is calculated by PID control. Then, after the difference $\Delta Q$ between the actual flow rate and the target flow is detected, PID control is performed, so that the powering of the electric motor that opens and closes the flow rate control valve (e.g., butterfly valve or the like) used as an actuator is determined; as a result, the response delay from the arbitrary setting of the water temperature of the cooling water to the point in time that the actual water temperature is reached is eliminated. Furthermore, since the other parts are the same as in the abovementioned FIGS. 1, 3, 4 and the like, a concrete description of these parts is omitted here.

Here, it will be understood that control that cancels the response delay, control that is linked to the engine auxiliary devices, control that provides an automatic learning function, control that varies the set water temperature according to the engine load, a correction that reduces power consumption and a correction of the hysteresis in the mechanical driving parts are effectively performed.

Furthermore, the structures of the other constituent parts and cooling water circulation passages, and the numerical values and the like described in the various parts, are not limited to the structures and numerical values described in the abovementioned figures and description. Parts of various configurations may be freely used. Furthermore, the descriptions of the various types of control mentioned above are merely examples; various configurations may be employed within limits that involve no departure from the spirit of the present invention.

INDUSTRIAL APPLICABILITY

As was described above, the electronically controlled thermostat control method of the present invention makes it possible to eliminate the problems encountered in conventional control, and to realize even higher cooling water temperature tracking characteristics with a high degree of precision at a low cost.

Furthermore, by using a constant-current circuit as the PTC powering circuit, the present invention makes it possible to obtain a heat radiation quantity that is not influenced by the heat-radiating element (e.g., PTC).

Furthermore, by providing engine load judgment means or a learning function, the present invention can supply, at a low cost, a set water temperature that is always suited to the vehicle, and can realize optimal fuel consumption and optimal powering.

The invention claimed is:

1. A method for controlling an electronically controlled thermostat which controls a temperature of a cooling water of an engine, the method comprising:
   providing an actuator which is configured to vary a degree of a valve opening without depending only on an actual temperature of a cooling water and comprises a WAX type thermo-element, a heat generating device attached to the WAX type thermo-element, a control controller which performs electrical powering for actuating the actuator and corrects a heat radiation amount of the WAX type thermo-element and hysteresis in parts that drive the actuator, and a controller which detects or calculates a difference between an actual flow rate and a target flow rate of the cooling water;
   calculating an elapsed time from the electrical powering to resulting actuation of the actuator, variation of the temperature of the cooling water and an amount of water temperature variation per unit time for predicting the temperature of the cooling water following the elapsed time;
   generating a predicted temperature of the cooling water; and
   controlling the actuator in accordance with the predicted temperature of the cooling water.

2. The method according to claim 1, wherein the control controller comprises a control that links an actuator control to a control of auxiliary devices attached to the engine when the actuator requires considerable powering.

3. The method according to claim 1, wherein the control controller comprises a control that automatically determines one of PID and PI control coefficients used in control of the electronically controlled thermostat in accordance with a layout of different engines or cooling water circulation systems.

4. The method according to claim 1, wherein the control controller comprises a control that cuts the electrical powering of the actuator in cases a temperature difference between an arbitrarily set cooling water temperature and the temperature of the cooling water following application of control is equal to or less than a specified value.

5. The method according to claim 1, wherein the control controller comprises a control that judges whether a driver is a person who commonly uses a high engine load or a person who commonly uses a low engine load, and varies a set water temperature accordingly.

6. The method according to claim 1, wherein the control controller comprises means for predicting a radiator flow rate by detecting parameters other than the radiator flow rate.

7. The method according to claim 1, wherein the control controller comprises a control that corrects an element lift by predicting an amount of deterioration in the element lift.

8. The method according to claim 1, wherein the control controller judges that the electronically controlled thermostat has malfunctioned in cases a measurement of a resistance value of the thermo-element at a time that the engine is started indicates that a difference between the resistance value and a pre-stored reference resistance value is equal to or greater than a specified value.

9. The method according to claim 6, wherein the control controller comprises means for predicting a radiator flow rate by detecting parameters which is at least one of an amount of element lift, a temperature of a heat generator, and a temperature of a temperature sensor.

10. The method according to claim 1, wherein the control controller links an actuator control to a control of auxiliary devices attached to the engine when the actuator requires considerable powering.

11. The method according to claim 1, wherein the control controller automatically determines one of PID and PI control coefficients used in control of the electronically controlled thermostat in accordance with a layout of different engines or cooling water circulation systems.

12. The method according to claim 1, wherein the control controller cuts the electrical powering of the actuator in cases a temperature difference between an arbitrarily set cooling water temperature and the temperature of the cooling water following application of control is equal to or less than a specified value.

13. The method according to claim 1, wherein the control controller judges whether a driver is a person who commonly uses a high engine load or a person who commonly uses a low engine load, and varies a set water temperature accordingly.

14. The method according to claim 1, wherein the control controller predicts a radiator flow rate by detecting parameters other than the radiator flow rate.

15. The method according to claim 1, wherein the control controller corrects an element lift by predicting an amount of deterioration in the element lift.

16. The method according to claim 1, wherein the control controller judges that the electronically controlled thermostat has malfunctioned in cases a measurement of a resistance value of the thermo-element at a time that the engine is started indicates that a difference between the resistance value and a pre-stored reference resistance value is equal to or greater than a specified value.

17. The method according to claim 14, wherein the control controller predicts a radiator flow rate by detecting parameters which is at least one of an amount of element lift, a temperature of a heat generator, and a temperature of a temperature sensor.

* * * * *